Sept. 15, 1931.    R. F. HUXMAN    1,823,199
GRASS CLIPPER
Filed Dec. 17, 1928
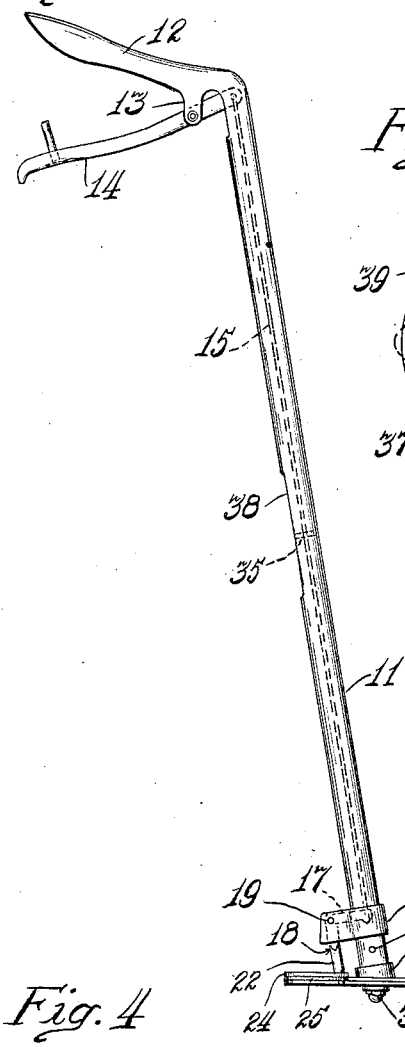
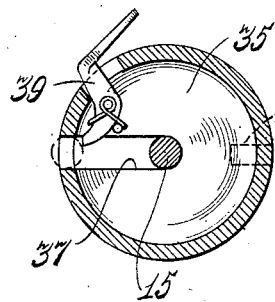
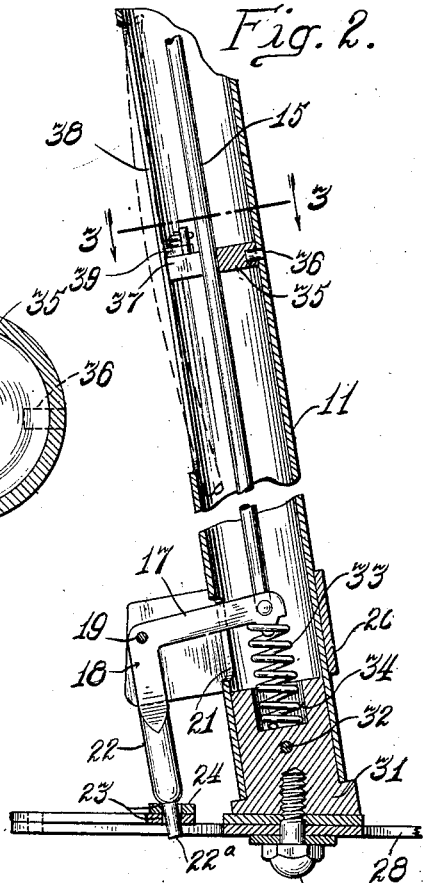
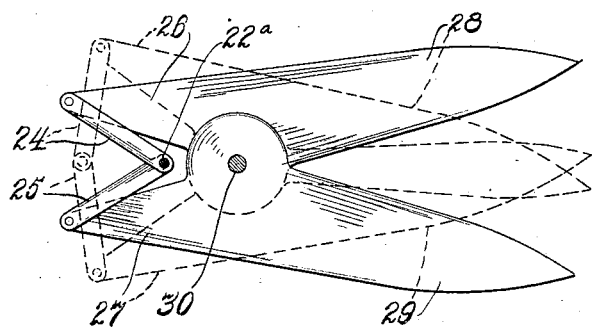
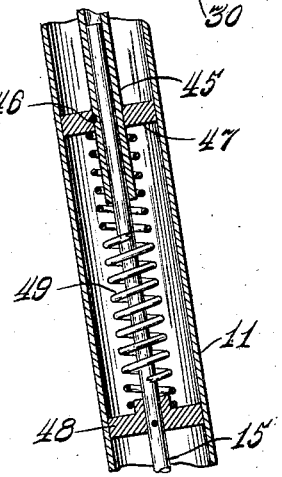
Inventor
Richard F. Huxman
Attorney Patented Sept. 15, 1931

1,823,199

UNITED STATES PATENT OFFICE

RICHARD F. HUXMAN, OF BENTON HARBOR, MICHIGAN

GRASS CLIPPER

Application filed December 17, 1928. Serial No. 326,618.

The invention relates to clippers and more particularly to clippers of the type used in trimming the edges of lawns, and in cutting grass or the like.

It is an object of the invention to provide a grass clipper of the class described having a long handle member by which the operator may control the operation while walking in an upright position.

Another object is to provide in a device of the character described having means for automatically rendering the cutting elements thereof inoperative when said elements come in contact with or engage a relatively hard object and maintaining the said elements in said inoperative position until the said means are manually released by the operator.

Another object is to provide a grass clipper having means associated therewith for preventing the operation of the cutting means thereof, when encountering a solid substance such as stone, wood or the like when trimming or cutting the grass of a lawn.

Another object is to provide a construction whereby the cutting elements of the clipper are maintained in an inoperative position when a relatively hard object that may cause injury to the cutting elements is encountered.

Another object of the invention is to provide a grass clipper of the character described having a relatively long operating handle whereby the said clipper may be operated by an operator in an upright position, and means associated with said handle for automatically rendering the clipper inoperative upon encountering a relatively hard object.

Another object is to provide a clipper of the class described which is simple in construction and operation and cheaply manufactured.

Another object is to provide a clipper having a vertical handle member, shearing blades at the lower portion thereof, operating means located at the upper end of the handle member, resilient means operatively connecting the operating means with the shearing blades for actuating the same, and means for rendering and locking the said operating means inoperative, should the shearing blades encounter a relatively hard object; such as, for example, wood, stone, or the like.

With the foregoing and other objects in view, which will appear as the description proceeds, this invention consists in construction, arrangement and combination of parts of my device whereby the objects contemplated are attained, as hereinafter more fully set forth, pointed out in the appended claims, and illustrated in the accompanying drawings, in which:

Figure 1 is an elevation of a lawn clipper embodying the features of the invention.

Figure 2 is a vertical sectional view through the lower portion of the grass clipper disclosing the operating mechanism.

Figure 3 is a sectional view taken on line 3—3 of Fig. 2.

Figure 4 is a sectional plan of the grass clipper showing the cutting blades and means for operating same.

Figure 5 is a sectional view of a fragment of the vertical member showing a modified form of construction.

In the construction shown in Figs. 1 to 4, inclusive, in the drawings, the vertical tubular member 11 is provided on its upper end with a handle 12 having downwardly extending ears 13 adapted to receive a cooperating lever 14, pivotally mounted in said ears, said lever being connected on the inner end thereof with upper end of a push rod 15, operating vertically in the handle member 11, as shown. The lower end of said push rod is pivoted to one arm 17 of the bell crank lever 18, which is pivoted at 19 in the bracket 20 located near the lower end of the vertical tubular member 11, said arm extending through the slot 21 in said tubular member. The other arm 22 of said bell crank extends downwardly, as shown, and is provided with a reduced end portion 22a, adapted to be received in openings 23 provided therefore in one end of each of a pair of links 24 and 25, the other ends of which links 24 and 25 are pivotally connected with the shanks 26 and 27 respectively of a pair of pivotally mounted cooperating shear blades 28 and 29.

The shear blades 28 and 29 are mounted one above the other for rotation independently of one another by means of cap screw 30, threaded into the under side of a plug 31 which is secured in the lower end of the tubular member 11, and is held in place therein by a pin 32, or in any other suitable manner. When the blades 28 and 29 are open or spread, the links 24 and 25 extend forwardly and convergingly between the shanks 26 and 27, as shown in full links in Fig. 4. If now the lever 14 is manipulated the push rod 15 is moved downwardly rocking the bell crank lever 18, by which the links 24 and 25 are swung to straighten out and to extend straight across and in substantial alignment between the shanks 26 and 27, as shown in dotted lines in Fig. 4. This action, of course, spreads the shanks at their rear ends and brings the blades 28 and 29 together, the action being similar to a toggle.

A compression spring 33 is interposed between the arm 17 of the bell crank 18 and the cap or plug 31, a pocket 34 being provided in the latter to retain said spring, as a means whereby the operating parts are returned to normal position after shearing.

To prevent damage to the cutting edges of the shearing blades and possible injury to the other parts of the device when encountering a relatively solid substance, such as a piece of stone or wood when trimming a lawn, the push rod is made relatively small in cross section so as to be resilient and will buckle when the shear blades are prevented from moving towards each other and the user exerts undue force on the operating lever 14.

It is desirable to provide a means to retain the push rod in this inoperative or buckled position as a means of calling the attention of the operator to the obstruction. To attain this result a circular disk 35 is located within the tubular member 11 intermediate its ends, said collar being secured in place by a pin 36, or in any other suitable manner.

The disk 35 is provided with a radial slot 37 which is adapted to register with an elongated vertical slot 38 provided in the tubular member 11. Upon the application of pressure to the top of the push rod 15, when the blades 28 and 29 are prevented from moving towards each other, because of encountering a relatively hard object, the central portion of said rod will buckle and move to the position shown in dotted lines in Fig. 2. A pivoted latch 39 is provided for holding and locking the rod in said buckled position, whereby the said device is rendered inoperative until the release of the latch. However, prior to releasing the latch the operator must first remove the obstacle.

In the modified form of construction shown in Fig. 5, the push rod 15 terminates within a sleeve 45, the upper end of which is pivotally connected to the operating lever 14. Located near the lower end of the sleeve 45 and secured thereto by a pin 46 is a collar 47, the rod 15 is also provided with a fixed collar 48 spaced below the lower end of the sleeve 45 and a compression spring 49 is interposed between the two collars.

It can readily be understood that when the cutting blades encounter any resistance and the operating lever is manipulated, the resistance of the spring 49 is overcome and the sleeve 45 telescopes on the rod 14, without imparting motion to the shearing blades.

The collars 47 and 48 are of a diameter slightly less than the inside diameter of the tubular member to provide guide means for the free ends of the push rod and sleeve.

Although two forms of the invention are illustrated, one of which shows the resilient push rod and the other showing the compression spring positioned between two collars, each of the forms is adapted for carrying out the purpose for which it is designed in a simple and efficient manner. It will be understood, however, that the invention is not limited to the illustrated forms as it may be otherwise embodied within the scope of the following claims.

I claim:

1. In a device of the class described, comprising a pair of pivotally mounted co-operating blades, and a resilient push rod operatively connected therewith for moving said pivoted blades to closed position.

2. In a device of the class described, comprising a vertically extending hollow handle member, a pair of co-operating blades pivotally mounted on the lower end of said handle member and a resilient push rod operatively connected with said blades, extending through said handle member for moving said co-operating blades to closed position.

3. In a device of the class described, comprising, a hollow handle member, a pair of co-operating shear blades on said handle member, resilient pushing means operatively connected with said blades in handle member for operating said blades, and means in said handle member for maintaining said resilient means inoperative.

4. In a device of the class described, comprising, a hollow handle, a pair of co-operating shear blades mounted on said handle, resilient pushing means operatively connected with said blades extending through said handle for normally operating said blades, and means for guiding said resilient means into inoperative position when said shear blades encounter abnormal conditions.

5. In a device of the class described comprising, a pair of pivotally mounted co-operating shear blades, pushing means operatively connected with said shear blades for operating said blades, means whereby said pushing means is guided to inoperative position under abnormal conditions, and latch means for locking said pushing means in said inoperative position.

6. In combination with a vertically extending handle, co-operating blades pivotally mounted on the lower end of said handle, each blade being provided with a rearwardly extending shank, and links connected to said shank, resilient pushing means co-operating with said co-operating blades, and means whereby said resilient pushing means may be retained in an inoperative position.

7. In combination with a vertically extending handle, a pair of cooperating blades pivotally mounted on the lower end thereof, each blade being provided with a rearwardly extending shank portion, a pair of links connecting said shanks and a flexible push rod for operating said cooperating blades.

8. In combination with a vertically extending handle, cooperating blades pivotally mounted on the lower end of said handle, each blade being provided with a rearwardly extending shank, links connecting said shanks, a bell crank lever operatively connected to said links, an operating lever and resilient pushing means connecting said operating lever and said bell crank.

9. The combination of a vertically extending handle, cooperating blades, pivotally mounted on the lower end thereof, each blade being provided with a rearwardly extending shank, links connecting said shank, a bell crank operatively connected to said links, an operating lever at the upper end of said vertical handle member, resilient pushing means operatively connecting said bell crank with said operating lever, and means for guiding said resilient means into inoperative position.

In testimony whereof I affix my signature at 10 South LaSalle Street, Chicago, Illinois.

RICHARD F. HUXMAN.